United States Patent
Atanassov et al.

(10) Patent No.: US 10,732,285 B2
(45) Date of Patent: Aug. 4, 2020

(54) MULTI-PHASE ACTIVE LIGHT DEPTH SYSTEM

(71) Applicant: QUALCOMM Incorporated, San Diego, CA (US)

(72) Inventors: Kalin Atanassov, San Diego, CA (US); Sergiu Goma, San Diego, CA (US); James Nash, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 16/143,070

(22) Filed: Sep. 26, 2018

(65) Prior Publication Data

US 2020/0096640 A1    Mar. 26, 2020

(51) Int. Cl.
| | |
|---|---|
| *G01S 17/89* | (2020.01) |
| *G01S 7/486* | (2020.01) |
| *G01S 7/4863* | (2020.01) |
| *G06T 7/521* | (2017.01) |
| *G06T 3/40* | (2006.01) |
| *H04N 5/345* | (2011.01) |
| *H04N 5/353* | (2011.01) |
| *H04N 5/374* | (2011.01) |

(52) U.S. Cl.
CPC ............ *G01S 17/89* (2013.01); *G01S 7/4863* (2013.01); *G01S 7/4868* (2013.01); *G06T 3/4038* (2013.01); *G06T 7/521* (2017.01); *H04N 5/345* (2013.01); *G06T 2207/10028* (2013.01); *G06T 2207/20221* (2013.01); *H04N 5/3532* (2013.01); *H04N 5/374* (2013.01)

(58) Field of Classification Search
None
See application file for complete search history.

(56) References Cited

U.S. PATENT DOCUMENTS

| | | | | |
|---|---|---|---|---|
| 7,002,626 | B2* | 2/2006 | Pain | H01L 27/14609 257/223 |
| 9,119,544 | B2* | 9/2015 | Dai | A61B 1/00004 |
| 9,866,816 | B2 | 1/2018 | Retterath | |
| 10,033,988 | B2 | 7/2018 | Smith et al. | |
| 2004/0037450 | A1* | 2/2004 | Bradski | G06K 9/00228 382/103 |
| 2010/0302364 | A1 | 12/2010 | Kim et al. | |
| 2015/0253428 | A1* | 9/2015 | Holz | G01S 17/42 356/5.01 |
| 2015/0373322 | A1 | 12/2015 | Goma et al. | |

(Continued)

OTHER PUBLICATIONS

International Search Report and Written Opinion—PCT/US2019/045878—ISA/EPO—dated Nov. 19, 2019.

*Primary Examiner* — Fernando Alcon
(74) *Attorney, Agent, or Firm* — Paradice & Li LLP (57) ABSTRACT

Aspects of the present disclosure relate to systems and methods for structured light (SL) depth systems. A depth finding system includes one or more processors and a memory, coupled to the one or more processors, includes instructions that, when executed by the one or more processors, cause the system to capture a plurality of frames based on transmitted pulses of light, where each of the frames is captured by scanning a sensor array after a respective one of the pulses has been transmitted, and generate an image depicting reflections of the transmitted light by combining the plurality of frames, where each of the frames provides a different portion of the image.

26 Claims, 8 Drawing Sheets

(56) References Cited

U.S. PATENT DOCUMENTS

| | | | |
|---|---|---|---|
| 2016/0187199 A1* | 6/2016 | Brunk | G01J 3/2823 |
| | | | 348/89 |
| 2016/0307382 A1* | 10/2016 | Herman | G07C 9/00158 |
| 2016/0335778 A1 | 11/2016 | Smits et al. | |
| 2016/0360074 A1 | 12/2016 | Winer et al. | |
| 2017/0180654 A1* | 6/2017 | Swaminathan | H04N 13/254 |
| 2017/0180713 A1* | 6/2017 | Trail | G06F 3/011 |
| 2018/0188020 A1 | 7/2018 | Fuchikami | |
| 2019/0072771 A1* | 3/2019 | Hall | G06T 7/507 |

\* cited by examiner

MULTI-PHASE ACTIVE LIGHT DEPTH SYSTEM

TECHNICAL FIELD

This disclosure relates generally to systems and methods for structured light systems, and specifically to reducing interference in structured light systems.

BACKGROUND OF RELATED ART

A device may determine distances of its surroundings using different depth finding systems. In determining the depth, the device may generate a depth map illustrating or otherwise indicating the depths of objects from the device by transmitting one or more wireless signals and measuring reflections of the wireless signals. One such depth finding system is a structured light system. Structured light active sensing relies on transmitting and receiving spatial codes. Specifically, a known pattern of points is transmitted (such as near-infrared or other frequency signals of the electromagnetic spectrum), and the reflections of the pattern of points is measured and analyzed to determine depths of objects from the device. The depth of an object reflecting a particular code is proportional to the difference between the received code position and the original code position (e.g., when transmitted).

Most structured light systems include a narrowband filter at the front of the receiver to allow the reflected code to pass through with little interference. However, in outdoor applications, the interference light in band (e.g., sunlight) may enter the receiver through the narrowband filter. Such interference may lift the signal floor (e.g., saturating the pixel well) and/or introduce noise proportional to its level. As a result, depth decoding may fail when a sufficient amount of interference light enters the receiver.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for structured light (SL) depth systems. In one example implementation, a method for depth finding is disclosed. The example method may include capturing a plurality of frames based on transmitted pulses of light, where each of the frames is captured by scanning a sensor array after a respective one of the pulses has been transmitted, and generating an image depicting reflections of the transmitted light by combining the plurality of frames, where each of the frames provides a different portion of the image.

In another example, a depth finding system is disclosed. The depth finding system includes one or more processors and a memory, coupled to the one or more processors, includes instructions that, when executed by the one or more processors, cause the system to capture a plurality of frames based on transmitted pulses of light, where each of the frames is captured by scanning a sensor array after a respective one of the pulses has been transmitted, and generate an image depicting reflections of the transmitted light by combining the plurality of frames, where each of the frames provides a different portion of the image.

In a further example, a non-transitory computer-readable medium is disclosed. The non-transitory computer-readable medium may store instructions that, when executed by a processor, cause a depth finding system to capture a plurality of frames based on transmitted pulses of light, where each of the frames is captured by scanning a sensor array after a respective one of the pulses has been transmitted, and generate an image depicting reflections of the transmitted light by combining the plurality of frames, where each of the frames provides a different portion of the image.

In another example, a depth finding system is disclosed. The depth finding system includes means for capturing a plurality of frames based on transmitted pulses of light, where each of the frames is captured by scanning a sensor array after a respective one of the pulses has been transmitted, and means for generating an image depicting reflections of the transmitted light by combining the plurality of frames, where each of the frames provides a different portion of the image.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Aspects of the present disclosure may be used in structured light (SL) systems for determining depths. In particular, a method and apparatus for reducing interference in SL systems is provided by combining a multi-phase pulsed light source with a rolling-shutter sensor. During each phase, the light source transmits a pulse of light (e.g., including the projected code) that is reflected by an object and measured by a respective subset of camera pixels in the sensor apparatus (e.g., as a particular frame). More specifically, a different subset of camera pixels captures the reflected light from each successive pulse (e.g., for each successive phase). As a result, different portions of the sensor field of view are exposed for every frame. The frames are subsequently combined (e.g., stacked or stitched together) to produce a resulting sensor image from which the depth of the object can be determined.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as security systems, smartphones, tablets, laptop computers, vehicles, drones, or other devices) with are coupled to one or more structured light systems. While described below with respect to a device having or coupled to one structured light system, aspects of the present disclosure are applicable to devices having any number of structured light systems (including none, where structured light information is provided to the device for processing), and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Figure 1:
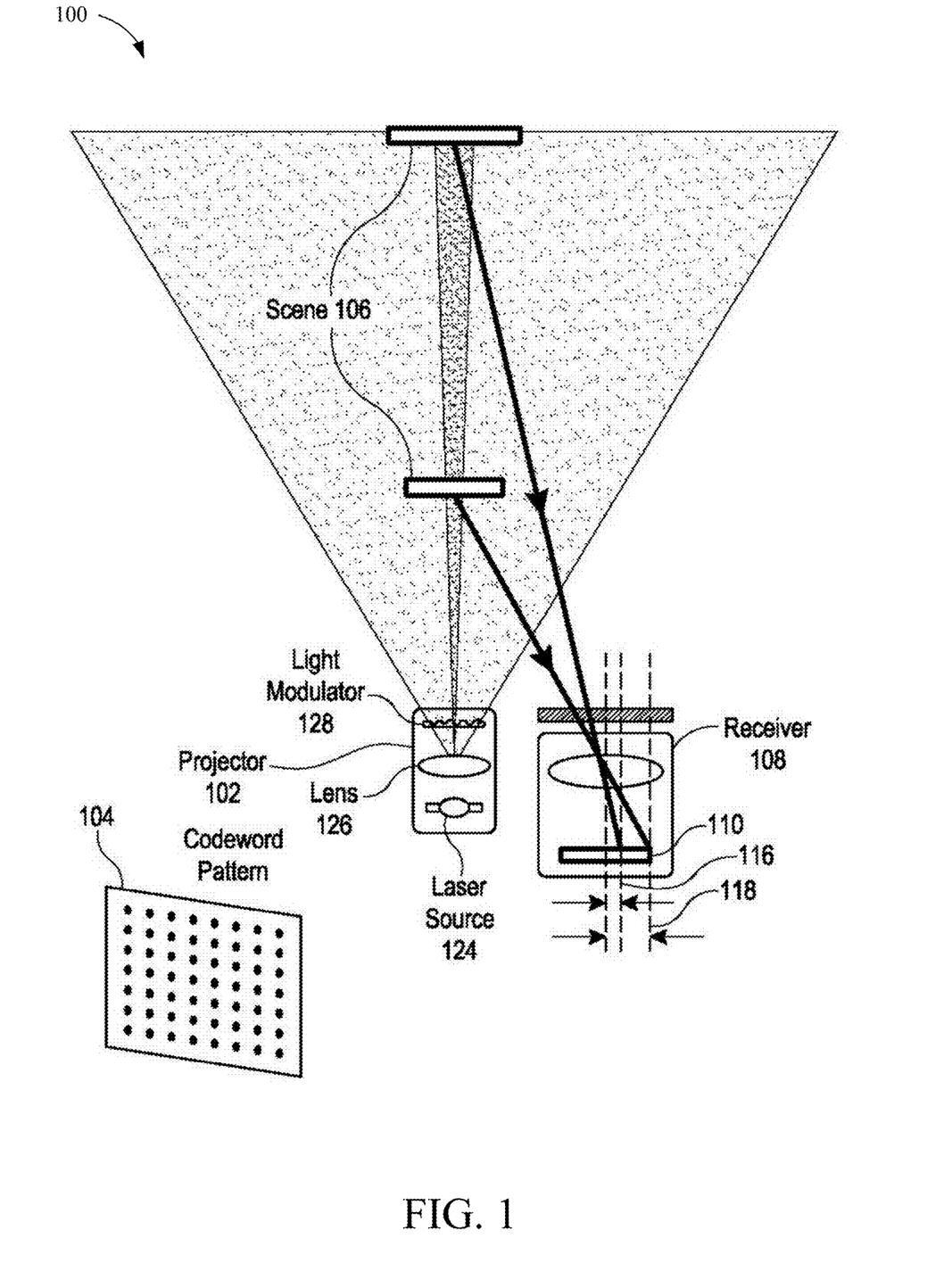
FIG. 1 is an example structured light system.

FIG. 1 is an example structured light system 100. The structured light system 100 may be used to generate a depth map (not pictured) of a scene 106. The structured light system 100 may include at least a projector or transmitter 102 and a receiver 108. The projector or transmitter 102 may be referred to as a "transmitter," "projector," "emitter," and so on, and should not be limited to a specific transmission component. Similarly, the receiver 108 may also be referred to as a "detector," "sensor," "sensing element," "photodetector," and so on, and should not be limited to a specific receiving component.

The transmitter 102 may be configured to project a codeword pattern 104 onto the scene 106. In some example implementations, the transmitter 102 may include one or more laser sources 124, a lens 126, and a light modulator 128. In some implementations, the transmitter 102 can further include a diffractive optical element (DOE) to diffract the emissions from one or more laser sources 124 into additional emissions. In some aspects, the light modulator 128 may comprise a DOE, for example, to adjust the intensity of the emission. The codeword pattern 104 may be hardcoded on the structured light system 100 (e.g., at the projector 102). The transmitter 102 may transmit one or more lasers from the laser source 124 through the lens 126 (and/or through a DOE or light modulator 128) and onto the scene 106. As illustrated, the transmitter 102 may be positioned on the same reference plane as the receiver 108, and the transmitter 102 and the receiver 108 may be separated by a distance called the "baseline."

The receiver 108 may be configured to detect (or "sense"), from the scene 106, a reflection 110 of the codeword pattern 104. The reflection 110 may include multiple reflections of the codeword pattern from different objects or portions of the scene 106 at different depths. Based on the baseline, displacement and distortion of the reflected codeword pattern 104, and intensities of the reflections 110, the structured light system 100 may be used to determine depths and locations of one or more objects in the scene 106. For example, locations and distances of transmitted light points in the projected codeword pattern 104 from light modulator 128 and corresponding locations and distances of light points in the reflection 110 received by a sensor of receiver 108 (such as distances 116 and 118 from the center to the portion of reflection 110) may be used to determine depths and locations of objects in the scene 106.

In some example implementations, the receiver 108 may include an array of photodiodes (such as avalanche photodiodes) to measure or sense the reflections. The array may be coupled to a complementary metal-oxide semiconductor (CMOS) sensor including a number of pixels or regions corresponding to the number of photodiodes in the array. The plurality of electrical impulses generated by the array may trigger the corresponding pixels or regions of the CMOS sensor to provide measurements of the reflections sensed by the array. Alternatively, a photosensitive CMOS sensor may sense or measure reflections including the reflected codeword pattern. The CMOS sensor may be logically divided into groups of pixels (such as 4×4 groups) that correspond to a size of a bit of the codeword pattern. Each group (which may also be of other sizes, including one pixel) may also be referred to as a bit.

As illustrated, the distance 116 corresponding to the reflected light point of the codeword pattern 104 at the further distance of the scene 106 is less than the distance 118 corresponding to the reflected light point of the codeword pattern 104 at the closer distance of the scene 106. Using triangulation based on the baseline and the distances 116 and 118, the structured light system 100 may be used to determine the differing distances of the scene 106 and to generate a depth map of the scene 106.

As described above, unwanted light (such as sunlight) may enter the receiver 108 and interfere with the reflected light 110. One possible solution for reducing interference is to increase the power or intensity of the laser source 124 used to transmit the codeword pattern 104. However, there is a limit to which the power of the laser source 124 can be increased (e.g., for eye safety purposes). The eye safety limit is based on the average laser power over a duration of time. Thus, by pulsing the laser source 124, the power of the transmitted light can be increased (e.g., while remaining below the eye safety limit) by reducing the duty ratio or duration of the pulses.

In some implementations, the timing (e.g., "opening" and "closing") of the receiver 108 may be synchronized with the pulsing of the laser source 124. For example, the photodiodes within the receiver 108 may be opened (or activated) to capture light and closed (or deactivated) to reject light. The duration for which a photodiode remains open may correspond to the "exposure time" of the photodiode. To further reduce unwanted light from entering the receiver 108, it may be desirable to limit the exposure times of the photodiodes to correspond with the durations of the pulses (e.g., and to reject ambient light in the absence of a pulse).

The opening and closing of the photodiodes may be controlled via an electrical shutter. More specifically, the opening and closing of the shutters may be timed so that the sensors can sample the received image only when a pulse is transmitted by the light source. In some implementations, the entire array of photodiodes may be opened and closed concurrently (e.g., using a "global shutter") each time a pulse of light is transmitted by the transmitter 102. Thus, each frame captured by a global-shutter sensor (e.g., upon opening and closing each of the photodiodes in the photodiode array) may include a full-frame image of the reflection 110. However, global-shutter sensors tend to be expensive and noisy to operate.

In contrast, rolling-shutter CMOS sensors are readily available and tend to be much cheaper to implement than global-shutter sensors. A rolling-shutter CMOS sensor progressively scans the photodiode array (e.g., row-by-row), such that different rows of photodiodes are activated at different times. Starting with the first (or last) row of photodiodes, the rolling-shutter CMOS sensor may scan each row of the photodiode array, in succession, until every row of the array has been scanned. Thus, depending on the duration of the pulse, each frame captured by a rolling-shutter CMOS sensor may include only a portion of the image of the reflection 110.

However, aspects of the present disclosure recognize that, by adjusting a relative timing offset between the pulses and the scans, the rolling-shutter CMOS sensor may be configured to generate a plurality of frames (e.g., over multiple phases), such that each captured frame includes a different portion or segment of the image of the reflection 110. These segments may be accumulated (e.g., over multiple phases) and combined (e.g., stacked or stitched together) to reproduce a full-frame image of the reflection 110. Accordingly, in some implementations of the structured light system 100, the receiver 108 may comprise a rolling-shutter CMOS sensor.

Among other advantages, the rolling-shutter CMOS sensor may provide a relatively low-cost alternative to global-shutter sensors. More specifically, by scanning the photodiode array in a successive manner, over multiple phases, and combining the results of each scan to recreate the full-frame image of the reflection 110, aspects of the present disclosure may provide a relatively robust and effective technique for filtering unwanted interference from entering the receiver 108.

Although a number of separate components are illustrated in FIG. 1, one or more of the components may be implemented together or include additional functionality. All described components may also not be required for a structured light system 100, or the functionality of components may be separated into separate components. Therefore, the present disclosure should not be limited to the example structured light system 100.

Figure 2:
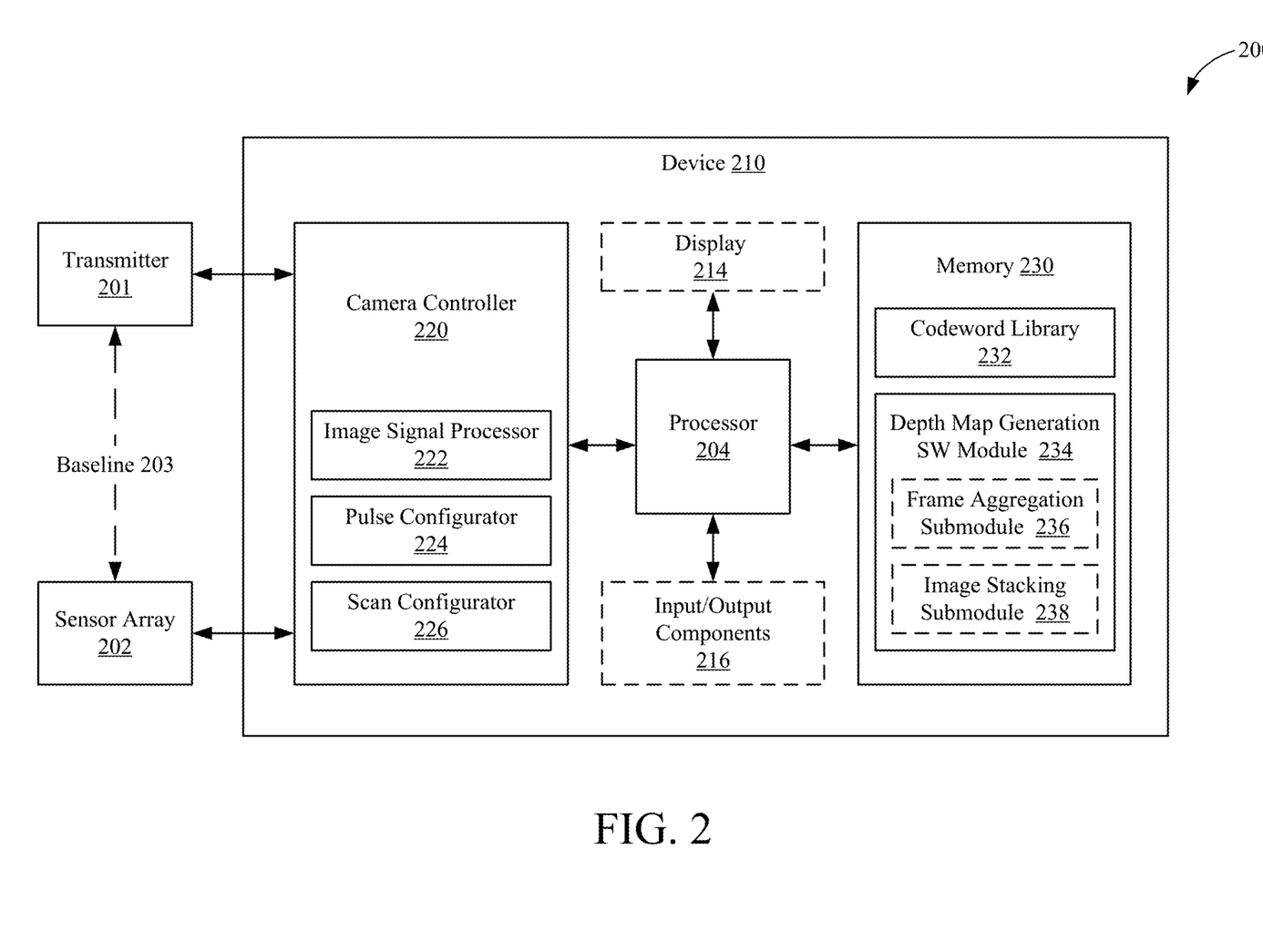
FIG. 2 is a block diagram of an example depth finding system.

FIG. 2 is a block diagram of an example depth finding system 200. The depth finding system 200 may be an example implementation of the structured light system 100 of FIG. 1. Accordingly, the depth finding system 200 may be configured to measure depth using structured light active sensing techniques. The system 200 includes a device 210 coupled to a transmitter 201 and a sensory array 202. With reference for example to FIG. 1, the transmitter 201 may be an example implementation of the transmitter 102 and the sensor array 202 may be an example implementation of the receiver 108 of the structured light system 100. As described above, the transmitter 201 and sensor array 202 may be separated by a baseline distance 203.

The device 210 includes a processor 204, a memory 230, and a camera controller 220. The device 210 may optionally include (or be coupled to) a display 214 and a number of input/output (I/O) components 216. The device 210 may include additional features or components not shown. For example, a wireless interface, which may include a number of transceivers and a baseband processor, may be included for a wireless communication device. The device 210 may be part of (or coupled to) other structured light systems or a different configuration for the depth finding system 200. For example, in some implementations, the device 210 may include or be coupled to additional receivers or sensor arrays (not shown) for calculating distances and locations of objects in a scene. The disclosure should not be limited to any specific examples or illustrations, including the example device 210.

The processor 204 may be one or more suitable processors capable of executing scripts or instructions of one or more software programs (such as instructions) stored within the memory 230. In some aspects, the processor 204 may be one or more general purpose processors that execute instructions to cause the device 210 to perform any number of functions or operations. In additional or alternative aspects, the processor 204 may include integrated circuits or other hardware to perform functions or operations without the use of software. While shown to be coupled to each other via the processor 204 in the example of FIG. 2, the processor 204, the memory 230, the camera controller 220, the optional display 214, and the optional I/O components 216 may be coupled to one another in various arrangements. For example, the processor 204, the memory 230, the camera controller 220, the optional display 214, and/or the optional I/O components 216 may be coupled to each other via one or more local buses (not shown for simplicity).

The display 214 may be any suitable display or screen allowing for user interaction and/or to present items (such as a depth map or a preview image of the scene) for viewing by a user. In some aspects, the display 214 may be a touch-sensitive display. The I/O components 216 may be or include any suitable mechanism, interface, or device to receive input (such as commands) from the user and to provide output to the user. For example, the I/O components 216 may include (but are not limited to) a graphical user interface, keyboard, mouse, microphone and speakers, squeezable bezel or border of the device 210, physical buttons located on device 210, and so on. The display 214 and/or the I/O components 216 may provide a preview image or depth map of the scene to a user and/or receive a user input for adjusting one or more settings of the device 210 (such as adjusting the intensity of transmissions by the transmitter 201, adjusting the size of the codewords used for the depth finding system 200, and so on).

The transmitter 201 and the sensor array 202 may be controlled by the camera controller 220 and/or processor 204. For example, the camera controller 220 may include an image signal processor (ISP) 222, a pulse configurator 224, and a scan configurator 226. The ISP 222 may be one or more processors to process information received by the sensor array 202 and/or transmitted by the transmitter 201. In some aspects, the ISP 222 may execute instructions from a memory (such as the memory 230 and/or a separate memory coupled to the ISP 222). In some other aspects, the ISP 222 may include specific hardware for operation. The ISP 222 may alternatively or additionally include a combination of specific hardware and the ability to execute software instructions.

The pulse configurator 224 may operate the transmitter 201 to transmit pulses of light. In some implementations, the pulse configurator 224 may control an intensity (e.g., brightness) and duration of each pulse (e.g., to remain below the eye safety limit). More specifically, the pulse configurator 224 may be adjust the intensity and/or duration to increase the signal-to-noise ratio (SNR) of each pulse while ensuring the overall transmit power remains below the eye safety limit.

The scan configurator 226 may operate the sensor array 202 to receive reflections of the transmitted light. In some implementations, the scan configurator 226 may control an opening (and closing) of the photodiodes in the sensor array 202 based, at least in part, on a timing of the pulses of light transmitted by the transmitter 201. Thus, in some aspects, the scan configurator 226 may be synchronized with the pulse configurator 224 to maintain a timing relationship between the transmission of pulses by the transmitter 201 and the reception of the reflections by the sensor array 202.

In some implementations, the scan configurator 226 may operate the sensor array 202 as a rolling shutter, such that individual rows of photodiodes are scanned or activated in a successive manner. In some aspects, the scan configurator 226 may control a speed and/or frequency of the scans to vary a timing offset, between the transmission of a pulse (e.g., by the transmitter 201) and the initiation of a corresponding scan (e.g., by the sensor array 202), for each full scan of the sensor array 202. More specifically, the scan configurator 226 may align the scans with the pulses such that each successive frame captured by the sensor array 202 includes a different portion or segment (if any) of the reflected image.

The memory 230 may store a library of codewords or light patterns 232 to be used in identifying codewords in light reflections received by the sensor array 202. For example, the codeword library 232 may store one or more codeword patterns to be transmitted by the transmitter 201. In some aspects, the codeword library 232 may include a plurality of possible patterns of different size codewords throughout various locations of the transmission. The memory 230 also may include a non-transitory computer-readable medium (one or more nonvolatile memory elements, such as EPROM, EEPROM, Flash memory, a hard drive, and the like) that may store at least the following software (SW) modules:

a depth map generation SW module 234 to generate a depth map based on the reflections received by the sensor array 202, the depth map generation SW module 234 including:

a frame aggregation submodule 236 to acquire or aggregate a plurality of frames based on the reflections received by the sensor array 202 over multiple phases of a mapping interval; and         an image stacking submodule 238 to combine the plurality of frames into a single image corresponding to the depth map, for example, by stacking or stitching together portions or segments of each frame.

Each software module includes instructions that, when executed by the processor 204, cause the device 210 to perform the corresponding functions.

For example, the processor 204 may execute the depth map generation SW module 234 to generate a depth map based on the reflection received by the sensor array 202. In executing the depth map generation SW module 234, the processor 204 may further execute the frame aggregation submodule 236 and the image stacking submodule 238. For example, the processor 204 may execute the frame aggregation submodule 236 to acquire or aggregate a plurality of frames based on the reflections received by the sensor array 202 over multiple phases of a mapping interval. The processor 204 also may execute the image stacking submodule 238 to combine the plurality of frames into a single image corresponding to the depth map, for example, by stacking or stitching together portions or segments of each frame.

Figure 3:
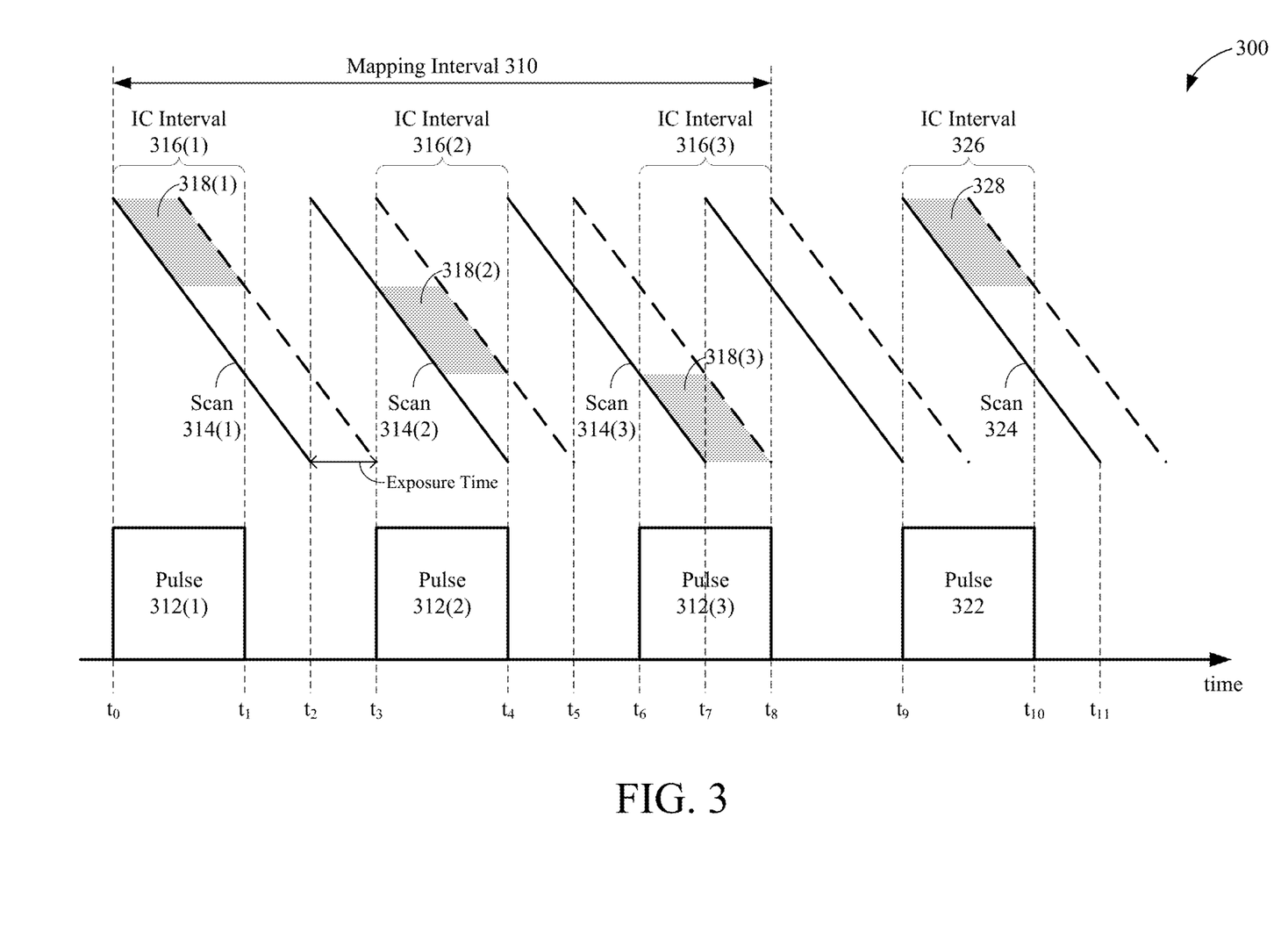
FIG. 3 is a timing diagram depicting an example multi-phase image capturing operation for depth finding, in accordance with some implementations.

FIG. 3 is a timing diagram depicting an example multi-phase image capturing operation 300 for depth finding, in accordance with some implementations. With reference for example to FIG. 2, the example operation 300 may be performed by the depth finding system 200 to generate an image that can be used for depth finding over multiple phases of a mapping interval 310 (e.g., from times $t_0$ to $t_8$). In the example of FIG. 3, the mapping interval 310 is subdivided into three phases or image capture (IC) intervals (e.g., IC intervals 316(1)-316(3)). However, in actual implementations, a mapping interval may include any number of phases (e.g., including fewer or more phases than those depicted in FIG. 3).

At time $t_0$, the depth finding system 200 transmits a first pulse of light 312(1) including a spatial pattern or codeword that can be used for depth finding (e.g., using structured light depth finding techniques). For example, the pulse configurator 224 may operate the transmitter 201 to transmit a codeword pattern from the codeword library 232. In the example of FIG. 3, the first pulse of light 312(1) has a pulse duration from times $t_0$ to $t_1$.

Also, at time $t_0$, the depth finding system 200 may initiate a first scan 314(1) of the surrounding scene (e.g., to detect reflections from the transmitted light). For example, the scan configurator 226 may operate the sensor array 202 to capture a frame of the surrounding scene. In some implementations, the scan configurator 226 may operate the sensor array 202 as a rolling shutter, for example, by activating individual rows of photodiodes of the sensor array 202 in a successive manner. Thus, as shown in FIG. 3, a full or complete scan of the sensor array 202 may be performed over a duration of time (e.g., from times $t_0$ to $t_2$).

As shown in FIG. 3, the solid diagonal line depicts the times at which the rolling shutter is "opened" for each row of photodiodes (e.g., where points higher up along the line correspond with rows higher up in the sensory array 202) and the dashed diagonal line depicts times at which the rolling shutter is "closed" for the corresponding row of photodiodes. Thus, the duration between the solid diagonal line and the dashed diagonal line (such as between times $t_2$ and $t_3$) represents the exposure time of each row of photodiodes. It is noted that photodiodes toward the top of the sensor array 202 are opened (and closed) at earlier times than photodiodes at toward the bottom of the sensor array 202.

As shown in FIG. 3, the first pulse 312(1) terminates (e.g., at time $t_1$) before the first scan 314(1) is completed (e.g., at time $t_2$). Thus, the reflected light from the first pulse 312(1) may be captured by only a subset of photodiodes of the sensor array 202 (e.g., within the first IC interval 316(1)). More specifically, due to the limited exposure times of each photodiode, only the photodiodes within the greyed region 318(1) are exposed for sufficient time to accurately capture a reflection from the first pulse 312(1). In the example of FIG. 3, the greyed region 318(1) comprises the upper third of the sensor array 202. In other words, photodiodes below the top third of the sensor array 202 may not be activated in time (or exposed for sufficient time) to capture the reflection from the first pulse 312(1).

At time $t_2$, the depth finding system 200 may initiate a second scan 314(2) of the surrounding scene. In the example of FIG. 3, the second scan 314(2) has a scan duration from times $t_2$ to $t_4$. Then, at time $t_3$, the depth finding system 200 transmits a second pulse of light 312(2) including a spatial pattern or codeword that can be used for depth finding. In the example of FIG. 3, the second pulse of light 312(2) has a pulse duration from times $t_3$ to $t_4$.

As shown in FIG. 3, the second pulse 312(2) is initiated (e.g., at time $t_3$) after the second scan 314(2) has already began (e.g., at time $t_2$). Thus, the reflected light from the second pulse 312(2) may be captured by only a subset of photodiodes of the sensor array 202 (e.g., within the second IC interval 316(2)). More specifically, due to the limited exposure times of each photodiode, only the photodiodes within the greyed region 318(2) are exposed for sufficient time to accurately capture a reflection from the second pulse 312(2). In the example of FIG. 3, the greyed region 318(2) comprises the middle third of the sensor array 202. In other words, photodiodes above and below the middle third of the sensor array 202 are activated too soon or too late to capture the reflection from the second pulse 312(2).

At time $t_4$, the depth finding system 200 may initiate a third scan 314(3) of the surrounding scene. In the example of FIG. 3, the third scan 314(3) has a scan duration from times $t_4$ to $t_7$. Then, at time $t_6$, the depth finding system 200 transmits a third pulse of light 312(3) including a spatial pattern or codeword that can be used for depth finding. In the example of FIG. 3, the third pulse of light 312(3) has a pulse duration from times $t_6$ to $t_8$.

As shown in FIG. 3, the third pulse 312(3) is initiated (e.g., at time $t_6$) well after the third scan 314(3) has already began (e.g., at time $t_4$). Thus, the reflected light from the third pulse 312(3) may be captured by only a subset of photodiodes of the sensor array 202 (e.g., within the third IC interval 316(3)). More specifically, due to the limited exposure times of each photodiode, only the photodiodes within the greyed region 318(3) are exposed for sufficient time to accurately capture a reflection from the third pulse 312(3). In the example of FIG. 3, the greyed region 318(3) comprises the lower third of the sensor array 202. In other words, photodiodes above the lower third of the sensor array 202 are activated too soon to capture the reflection from the third pulse 312(3).

It is noted that, at the end of the mapping interval 310 (e.g., at time $t_8$), the depth finding system 200 will have captured portions of the surrounding scene across all photodiodes in the sensor array 202. For example, the depth finding system 200 will have captured a first portion (e.g., upper third) of the scene in a frame generated as a result of the first scan 314(1), a second portion (e.g., middle third) of the scene in a frame generated as a result of the second scan 314(2), and a third portion (e.g., lower third) of the scene in a frame generated as a result of the third scan 314(3). Thus, in some implementations, the depth finding system 200 may combine portions of each frame to reproduce a full-frame image of the reflection from the surrounding scene. For example, the depth finding system 200 may combine the image data acquired during the first IC interval 316(1) with the image data acquired during the second IC interval 316(2) and the image data acquired during the third IC interval 316(3) to produce a complete depth map of the surrounding scene.

At time $t_9$, the depth finding system 200 transmits another pulse of light 322 including a spatial pattern or codeword that can be used for depth finding. In some implementations, the pulse of light 322 may coincide with start of a subsequent mapping interval (e.g., beginning at time $t_9$). In the example of FIG. 3, the pulse of light 322 has a pulse duration from times $t_9$ to $t_{10}$. Also, at time $t_9$, the depth finding system 200 may initiate another scan 324 of the surrounding scene. In the example of FIG. 3, the scan 324 has a scan duration from times $t_9$ to $t_{11}$. Thus, the reflected light from the pulse 322 may be captured by only a subset of photodiodes of the sensor array 202 (e.g., within a corresponding IC interval 326). As shown in FIG. 3, only those photodiodes within the greyed region 328 (e.g., comprising the upper third of the sensor array 202) are exposed for sufficient time to accurately capture a reflection from the pulse 322.

It is noted that the IC interval 326 is substantially similar to the IC interval 316(1) of the mapping interval 310. More specifically, the alignment of the scan 324 with the pulse 322 is substantially similar to the alignment of the first scan 314(1) to the first pulse 312(1). Thus, the image capturing operation 300 described above (e.g., from times $t_0$ to $t_8$) may be repeated, beginning at time $t_9$, to generate another image that can be used for depth finding. In some implementations, the depth finding system 200 may perform an additional scan (e.g., from times $t_7$ to $t_9$) between consecutive mapping intervals to maintain periodicity of the scans (e.g., as shown in FIG. 3). However, in other implementations, the depth finding system 200 may cease scanning between mapping intervals (e.g., so that the number of scans is equal to the number of pulses over any duration of time).

Figure 4A:
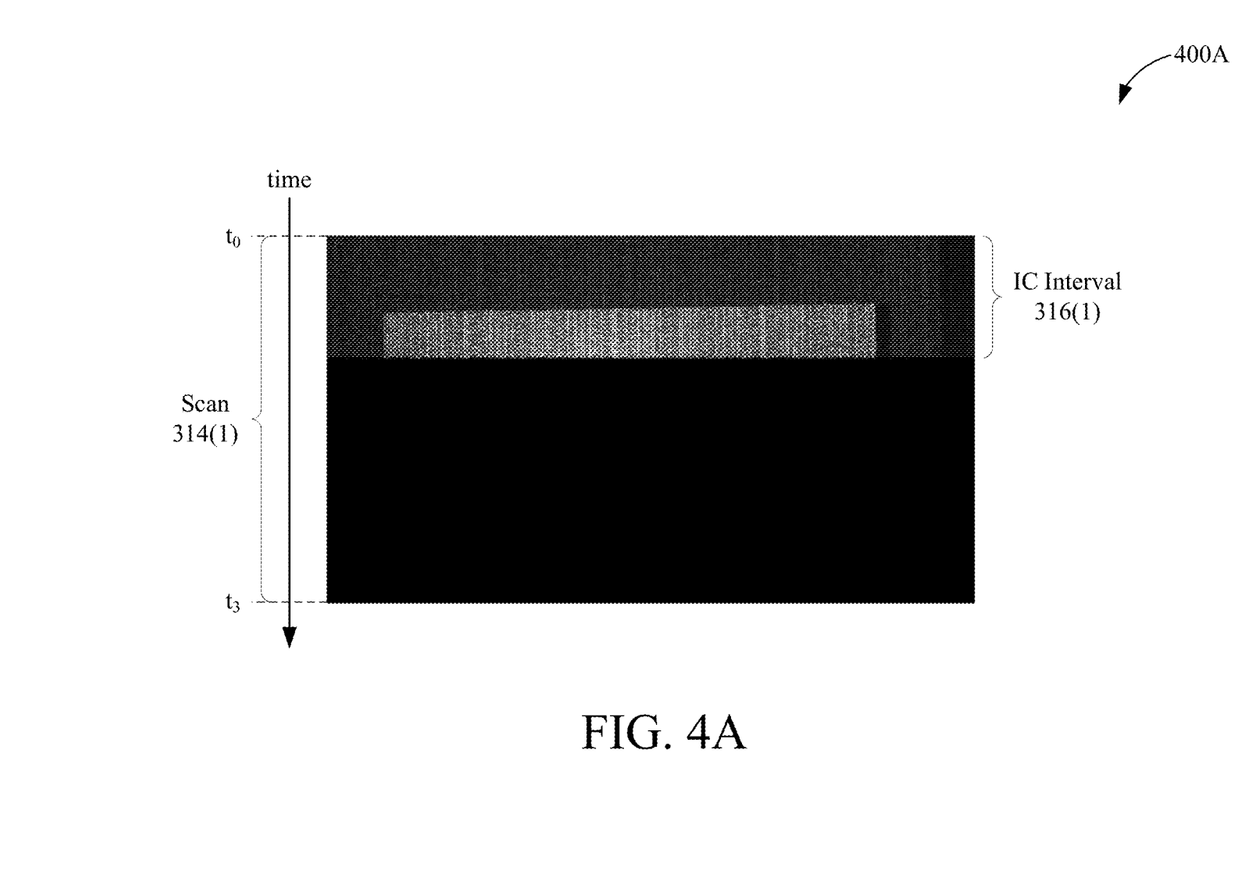
FIGS. 4A-4C show example frames that may be acquired during respective phases of a multi-phase image capturing operation.
Figure 4B:
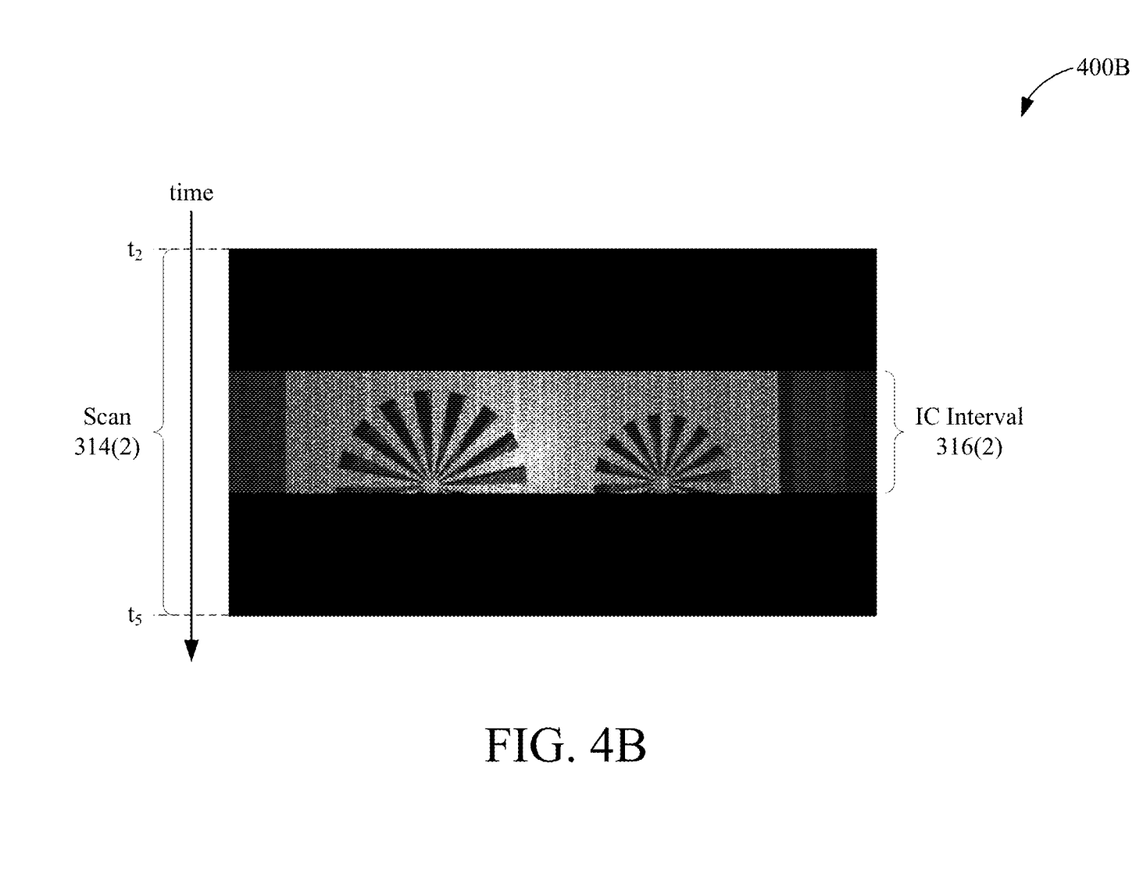
Figure 4C:
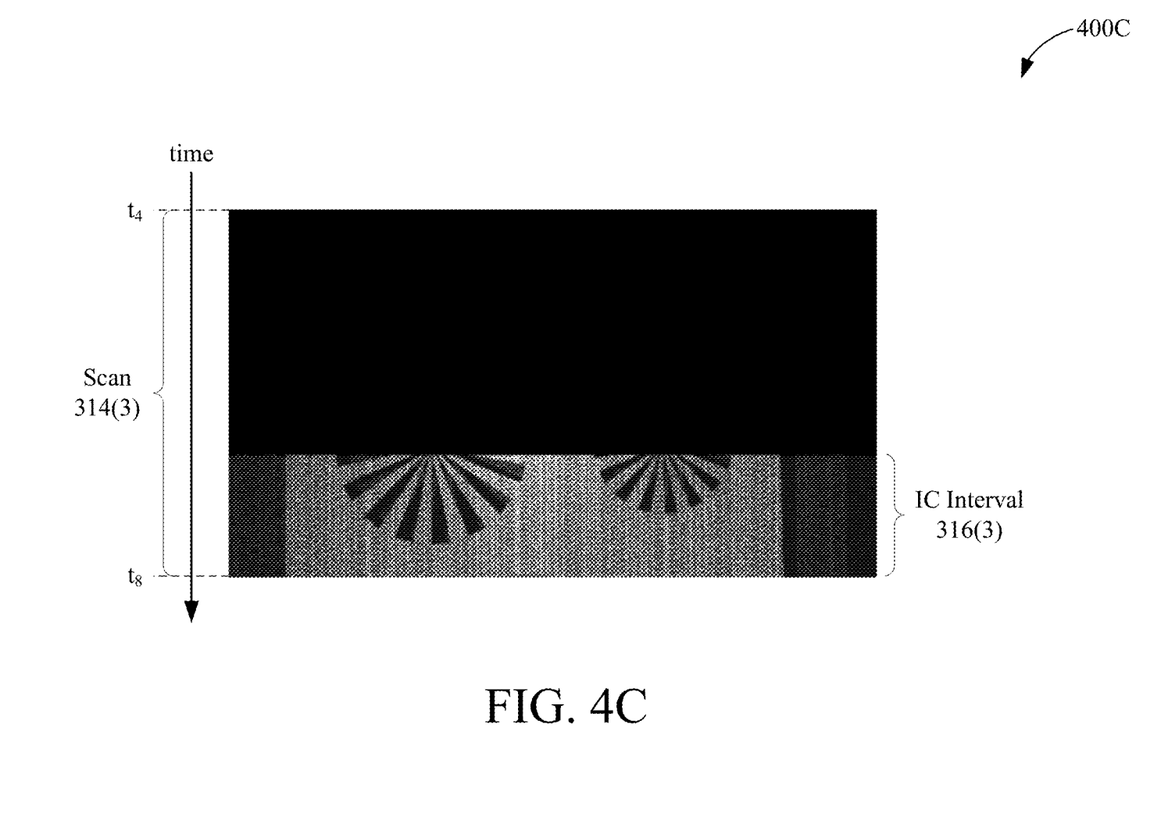

FIGS. 4A-4C show example frames 400A-400C that may be acquired during respective phases of a multi-phase image capturing operation. With reference for example to FIG. 3, the example frames 400A-400C may be captured by the depth finding system 200 during respective phases of the mapping interval 310 (e.g., in response to the scans 314(1)-314(3), respectively).

FIG. 4A shows a first frame 400A that may be acquired by the depth finding system 200 as a result of the first scan 314(1), from times $t_0$ to $t_3$. As described above, the depth finding system 200 may scan the sensor array 202 successively (e.g., row-by-row), from the top-most row (e.g., at time to) to the bottom-most row (e.g., at time $t_3$). However, because the first pulse 312(1) is only emitted for the duration of the first IC interval 316(1) (e.g., from times $t_0$ to $t_1$), only photodiodes in the upper third of the sensor array 202 are able to capture the reflected light from the first pulse 312(1). Thus, as shown in FIG. 4A, the first frame 400A may include only a portion (e.g., coinciding with the first IC interval 316(1)) of the image of the reflection from the first pulse 312(1).

FIG. 4B shows a second frame 400B that may be acquired by the depth finding system 200 as a result of the second scan 314(2), from times $t_2$ to $t_5$. As described above, the depth finding system 200 may scan the sensor array 202 successively (e.g., row-by-row), from the top-most row (e.g., at time $t_2$) to the bottom-most row (e.g., at time $t_5$). However, because the second pulse 312(2) is only emitted for the duration of the second IC interval 316(2) (e.g., from times $t_3$ to $t_4$), only photodiodes in the middle third of the sensor array 202 are able to capture the reflected light from the second pulse 312(2). Thus, as shown in FIG. 4B, the second frame 400B may include only a portion (e.g., coinciding with the second IC interval 316(2)) of the image of the reflection from the second pulse 312(2).

FIG. 4C shows a second frame 400C that may be acquired by the depth finding system 200 as a result of the third scan 314(3), from times $t_4$ to $t_8$. As described above, the depth finding system 200 may scan the sensor array 202 successively (e.g., row-by-row), from the top-most row (e.g., at time $t_4$) to the bottom-most row (e.g., at time $t_8$). However, because the third pulse 312(3) is only emitted for the duration of the third IC interval 316(3) (e.g., from times $t_6$ to $t_8$), only photodiodes in the lower third of the sensor array 202 are able to capture the reflected light from the third pulse 312(3). Thus, as shown in FIG. 4C, the third frame 400C may include only a portion (e.g., coinciding with the third IC interval 316(3)) of the image of the reflection from the third pulse 312(3).

Figure 5:
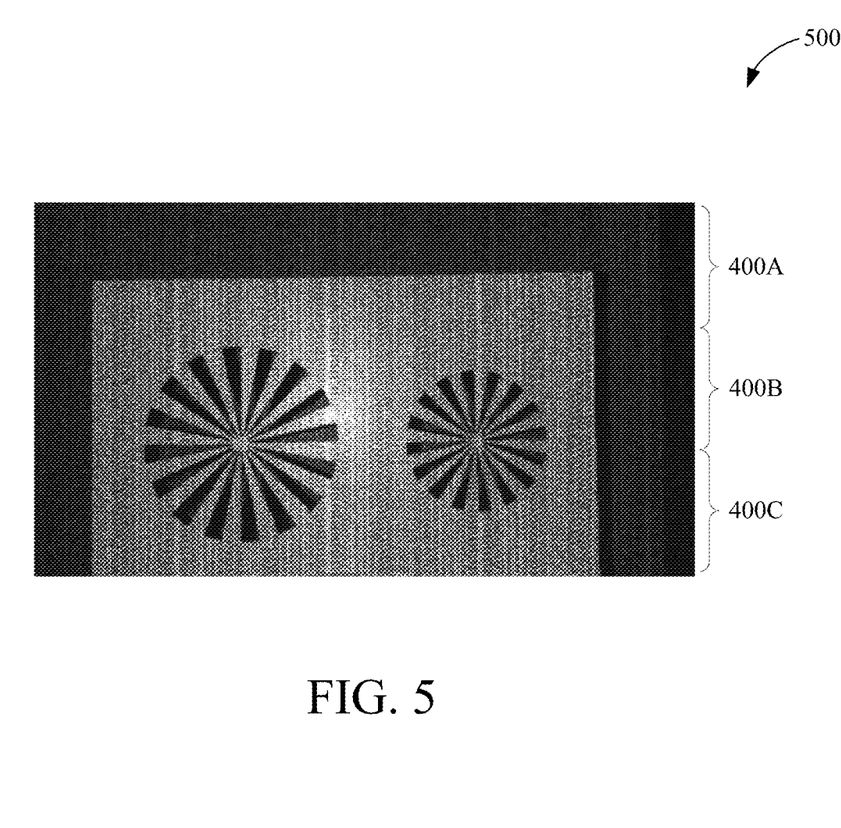
FIG. 5 shows an example image that may be produced by combining the frames of FIGS. 4A-4C.

FIG. 5 shows an example image 500 that may be produced by combining the frames of FIGS. 4A-4C. More specifically, the image 500 may be generated by combining or stacking different portions of each of the frames 400A-400C. For example, the upper portion of the image 500 may be derived from the upper portion of the first frame 400A (e.g., acquired during the first IC interval 316(1)), the middle portion of the image 500 may be derived from the middle portion of the second frame 400B (e.g., acquired during the second IC interval 316(2)), and the lower portion of the image 500 may be derived from the lower portion of the third frame 400C (e.g., acquired during the third IC interval 316(3)).

In some implementations, the image 500 may be used as a depth map for determining depths of objects in a surrounding scene. For example, the image 500 may include reflections of a transmitted codeword pattern from various objects or portions of the scene at various depths. Based on the baseline (e.g., separation between the transmitter and the receiver), display and distortion of the reflected codeword pattern, and intensities of the reflections, a depth finding system (such as the depth finding system 200 of FIG. 2) may use the image 500 to determine depths and locations of one or more objects in the surrounding scene. For example, locations and distances of transmitted light points in the projected codeword pattern and corresponding locations and distances of light points in the reflection captured by the image 500 may be used to determine depths and locations of objects in the scene.

Figure 6:
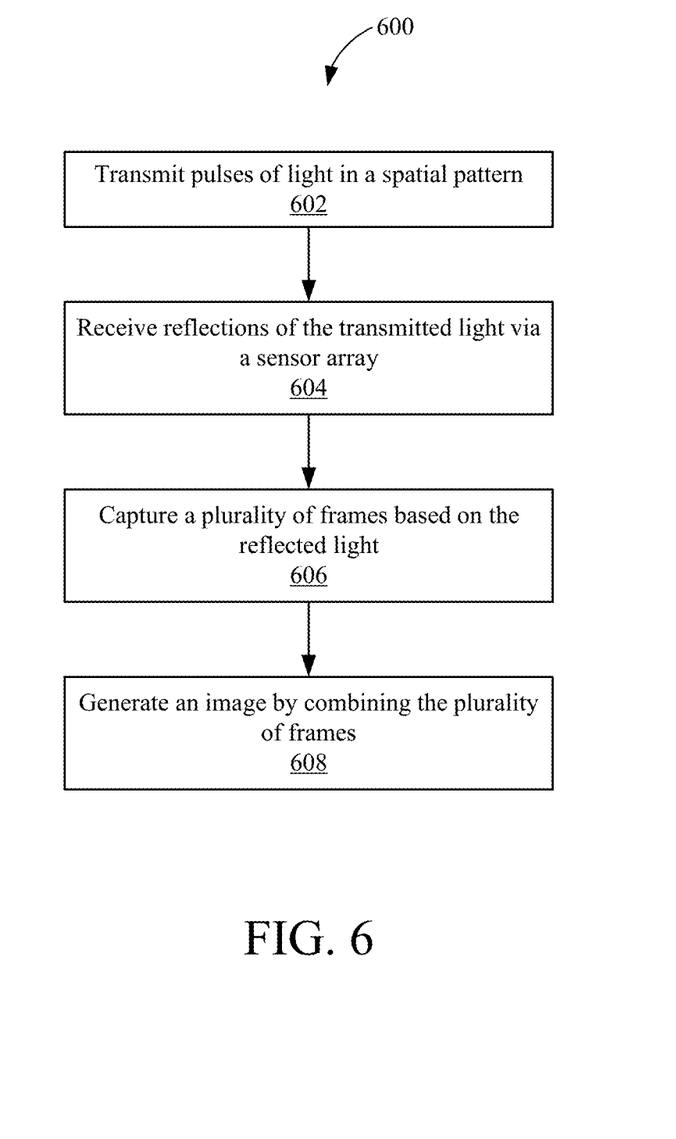
FIG. 6 is an illustrative flowchart depicting an example depth finding operation, in accordance with some implementations.

FIG. 6 is an illustrative flowchart depicting an example depth finding operation 600, in accordance with some implementations. The operation 600 may be performed by any suitable device, such as the structured light system 100 of FIG. 1 and/or the depth finding system 200 of FIG. 2. With reference for example to FIG. 2, the example operation 600 may be performed by the depth finding system 200 to generate an image that can be used for depth finding (such as a depth map).

The depth finding system 200 may transmit pulses of light in a spatial pattern (602). For example, the pulse configurator 224 may operate the transmitter 201 to transmit a codeword pattern from the codeword library 232. In some implementations, the pulse configurator 224 may control an intensity (e.g., brightness) and duration of each pulse. More specifically, the pulse configurator 224 may be adjust the intensity and/or duration to increase the signal-to-noise ratio (SNR) of each pulse while ensuring the overall transmit power remains below the eye safety limit.

The depth finding system 200 may further receive reflections of the transmitted light via a sensor array (604). For example, the scan configurator 226 may operate the sensor array 202 to capture a frame of the surrounding scene. In some implementations, the scan configurator 226 may operate the sensor array 202 as a rolling shutter, for example, by activating individual rows of photodiodes of the sensor array 202 in a successive manner.

The depth finding system 200 may capture a plurality of frames based on the reflected light (606). In some implementations, the scan configurator 226 may align the scans with the pulses such that each successive frame captured by the sensor array 202 includes a different portion or segment (if any) of the reflected image. Furthermore, the processor 204 may execute the frame aggregation submodule 236 to acquire or aggregate a plurality of frames based on the reflections received by the sensor array 202 over multiple phases of a mapping interval. With reference for example to FIGS. 4A-4C, each of the frames 400A-400C acquired by the depth finding system 200 may include a different portion of the reflected light a corresponding pulse.

The depth finding system may further generate an image by combining the plurality of frames (608). For example, the processor 204 may execute the image stacking submodule 238 to combine the plurality of frames into a single image corresponding to the depth map, for example, by stacking or stitching together portions or segments of each frame. As shown in FIG. 5, the image 500 may be generated by combining or stacking different portions of each of the frames 400A-400C (such as the upper portion of the first frame 400A, the middle portion of the second frame 400B, and the lower portion of the third frame 400C). In some implementations, the resulting image may be used as a depth map for determining depths of objects in a surrounding scene.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 206 in the example device 210 of FIG. 2) comprising instructions 208 that, when executed by the processor 204 (or the camera controller 220 or the ISP 212), cause the device 210 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 204 or the ISP 212 in the example device 210 of FIG. 2. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the structured light system is described as using a laser, signals at other frequencies may be used, such as microwaves, infrared, ultraviolet, and visible light. Additionally, the functions, steps or actions of the method claims in accordance with aspects described herein need not be performed in any particular order unless expressly stated otherwise. For example, the steps of the described example operations of FIG. 6, if performed by the device 200, the camera controller 220, the processor 204, and/or the ISP 222, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method, comprising:
   capturing a plurality of frames based on transmitted pulses of light, wherein each of the frames is captured by scanning a sensor array when a respective one of the pulses is transmitted and, for each scan of the sensor array, one or more photodiodes of the sensor array are closed during the transmission of the respective pulse, the scanning including:
      activating individual rows of the sensor array, in succession, based on the transmission of each pulse such that, during each scan of the array, a subset of the rows captures reflected light from the respective pulse and at least one of the rows does not capture any reflected light from the respective pulse; and
   generating an image depicting reflections of the transmitted light by combining the plurality of frames, wherein each of the frames provides a different portion of the image.

2. The method of claim 1, further comprising:
   transmitting the pulses of light in a spatial pattern; and
   receiving the reflections of the transmitted light via the sensor array.

3. The method of claim 1, wherein the sensor array comprises a complementary metal-oxide-semiconductor (CMOS) sensor device.

4. The method of claim 1, wherein the sensor array comprises a rolling-shutter sensor device.

5. The method of claim 1, wherein a different subset of rows captures the reflected light for each of the plurality of frames.

6. The method of claim 1, wherein a duration of each scan of the sensor array is greater than a duration of each pulse.

7. The method of claim 1, wherein a delay between the transmission of a pulse and a corresponding scan of the sensor array is different for each of the frames.

8. The method of claim 1, further comprising:
   determining a depth map based at least in part on a spatial pattern reflected in the image.

9. A depth finding system, comprising:
   one or more processors; and
   a memory coupled to the one or more processors and including instructions that, when executed by the one or more processors, cause the system to:
      capture a plurality of frames based on transmitted pulses of light, wherein each of the frames is captured by scanning a sensor array when a respective one of the pulses is transmitted and, for each scan of the sensor array, one or more photodiodes of the sensor array are closed during the transmission of the respective pulse, execution of the instructions for scanning the sensor array further causing the system to:
         activate individual rows of the sensor array, in succession, based on the transmission of each pulse such that, during each scan of the array, a subset of the rows captures reflected light from the respective pulse and at least one of the rows does not capture any reflected light from the respective pulse; and generate an image depicting reflections of the transmitted light by combining the plurality of frames, wherein each of the frames provides a different portion of the image.

10. The system of claim 9, further comprising:
a transmitter to transmit the pulses of light in a spatial pattern; and
the sensor array to receive the reflections of the transmitted light.

11. The system of claim 9, wherein the sensor array comprises a complementary metal-oxide-semiconductor (CMOS) sensor device.

12. The system of claim 9, wherein the sensor array comprises a rolling-shutter sensor device.

13. The system of claim 9, wherein a different subset of rows captures the reflected light for each of the plurality of frames.

14. The system of claim 9, wherein a duration of each scan of the sensor array is greater than a duration of each pulse.

15. The system of claim 9, wherein a delay between the transmission of a pulse and a corresponding scan of the sensor array is different for each of the frames.

16. The system of claim 9, wherein execution of the instructions further causes the system to:
determine a depth map based at least in part on a spatial pattern reflected in the image.

17. A non-transitory computer-readable medium storing one or more programs containing instructions that, when executed by one or more processors of a depth finding system, cause the system to:
capture a plurality of frames based on transmitted pulses of light, wherein each of the frames is captured by scanning a sensor array when a respective one of the pulses is transmitted and, for each scan of the sensor array, one or more photodiodes of the sensor array are closed during the transmission of the respective pulse, execution of the instructions for scanning the sensor array further causes the system to:
activate individual rows of the sensor array, in succession, based on the transmission of each pulse such that, during each scan of the sensor array, a subset of the rows captures reflected light from the respective pulse and at least some of the rows do not capture any reflected light from the respective pulse; and
generate an image depicting reflections of the transmitted light by combining the plurality of frames, wherein each of the frames provides a different portion of the image.

18. The non-transitory computer-readable medium of claim 17, wherein execution of the instructions further causes the system to:
transmit the pulses of light in a spatial pattern; and
receive the reflections of the transmitted light via the sensory array.

19. The non-transitory computer-readable medium of claim 17, wherein the sensor array comprises a complementary metal-oxide-semiconductor (CMOS) sensor device.

20. The non-transitory computer-readable medium of claim 17, wherein the sensor array comprises a rolling-shutter sensor device.

21. The non-transitory computer-readable medium of claim 17, wherein
a different subset of rows captures the reflected light for each of the plurality of frames.

22. The non-transitory computer-readable medium of claim 17, wherein a duration of each scan of the sensor array is greater than a duration of each pulse.

23. The non-transitory computer-readable medium of claim 17, wherein a delay between the transmission of a pulse and a corresponding scan of the sensor array is different for each of the frames.

24. The non-transitory computer-readable medium of claim 17, wherein execution of the instructions further causes the system to:
determine a depth map based at least in part on a spatial pattern reflected in the image.

25. A depth finding system, comprising:
means for capturing a plurality of frames based on transmitted pulses of light, wherein each of the frames is captured by scanning a sensor array when a respective one of the pulses is transmitted and, for each scan of the sensor array, one or more photodiodes of the sensor array are closed during the transmission of the respective pulse, the means for scanning the sensor array including:
means for activating individual rows of the sensor array, in succession, based on the transmission of each pulse such that, during each scan of the sensor array, a subset of the rows captures reflected light from the respective pulse and at least some of the rows do not capture any reflected light from the respective pulse; and
means for generating an image depicting reflections of the transmitted light by combining the plurality of frames, wherein each of the frames provides a different portion of the image.

26. The depth finding system of claim 25, wherein
a different subset of rows captures the reflected light for each of the plurality of frames.

* * * * *